US008719480B2

(12) United States Patent
Bandholz et al.

(10) Patent No.: US 8,719,480 B2
(45) Date of Patent: May 6, 2014

(54) AUTOMATED NETWORK CONFIGURATION IN A DYNAMIC VIRTUAL ENVIRONMENT

(75) Inventors: Justin P. Bandholz, Cary, NC (US); Timothy P. Hiteshew, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 327 days.

(21) Appl. No.: 13/308,321

(22) Filed: Nov. 30, 2011

(65) Prior Publication Data

US 2013/0138854 A1 May 30, 2013

(51) Int. Cl.
*H05K 7/10* (2006.01)
*G06F 13/40* (2006.01)

(52) U.S. Cl.
CPC ................................ *G06F 13/4081* (2013.01)
USPC ......................................................... 710/302

(58) Field of Classification Search
USPC ........................................ 710/300–317, 8–19
See application file for complete search history.

(56) References Cited

U.S. PATENT DOCUMENTS

| | | | | | |
|---|---|---|---|---|---|
| 5,875,308 | A | * | 2/1999 | Egan et al. ..................... | 710/302 |
| 8,583,848 | B2 | * | 11/2013 | Miyoshi ........................ | 710/313 |
| 2008/0147938 | A1 | | 6/2008 | Freimuth et al. | |
| 2008/0256283 | A1 | * | 10/2008 | Chiu et al. .................... | 710/306 |
| 2009/0089464 | A1 | | 4/2009 | Lach et al. | |
| 2009/0119663 | A1 | * | 5/2009 | Mukherjee et al. ............... | 718/1 |
| 2009/0144477 | A1 | * | 6/2009 | Chen et al. .................... | 710/302 |
| 2010/0211717 | A1 | | 8/2010 | Uehara et al. | |
| 2010/0241767 | A1 | | 9/2010 | Corry et al. | |
| 2010/0281195 | A1 | | 11/2010 | Daniel et al. | |
| 2012/0084480 | A1 | * | 4/2012 | Reeves et al. ................. | 710/303 |
| 2012/0102252 | A1 | * | 4/2012 | Tsirkin ......................... | 710/302 |
| 2012/0110211 | A1 | * | 5/2012 | Desai ............................... | 710/9 |

FOREIGN PATENT DOCUMENTS

| | | |
|---|---|---|
| JP | 2005317021 A | 11/2005 |
| JP | 2008046722A A | 2/2008 |

OTHER PUBLICATIONS

Armstrong et al., "Advanced Virtualization Capabilities of POWER5 Systems", IBM J. Res. & Dev. vol. 49 No. 4/5 Jul./Sep. 2005, pp. 523-532.
Armstrong et al., "Configurable PCI Express Switch" JP2005317021(A) English Abstract, Nov. 10, 2005, 1 page.
Suzuki et al., "I/O Device and Method", JP2008046722(A) English Abstract, Feb. 28, 2008, 1 page.

* cited by examiner

*Primary Examiner* — Raymond Phan
(74) *Attorney, Agent, or Firm* — Katherine S. Brown; Jeffrey L. Streets

(57) ABSTRACT

A computer-implemented method, and computer program product, for switching the I/O protocol of a multiprotocol I/O adapter while a computer system including the multiprotocol I/O adapter is running. The method comprises running a multiprotocol I/O adapter using a first I/O protocol while a computer system including the multiprotocol I/O adapter is running, and logically removing the adapter from the system while the computer system continues running. The multiprotocol I/O adapter is then caused to switch to a second I/O protocol while the adapter is logically removed and the computer system continues running. While the computer system still continues to run, the multiprotocol I/O adapter is restarted. After restarting, the multiprotocol I/O adapter runs using the second I/O protocol while the computer system continues running. In a virtualization environment, the method allows a multiprotocol I/O adapter to meet the varying I/O requirements of one or more virtual machines.

20 Claims, 11 Drawing Sheets

AUTOMATED NETWORK CONFIGURATION IN A DYNAMIC VIRTUAL ENVIRONMENT

BACKGROUND

1. Field of the Invention

The present invention relates to the management of virtual machines. More specifically, the present invention relates to the configuration of network ports that are used by virtual machines.

2. Background of the Related Art

In a cloud computing environment, a user is assigned a virtual machine, sometimes also referred to as a virtual server, somewhere in the computing cloud. The virtual machine provides the software operating system and has access to physical resources, such as input/output bandwidth, processing power and memory capacity, to support the user's application. Provisioning software manages and allocates virtual machines among the available computer nodes in the cloud. Because each virtual machine runs independent of other virtual machines, multiple operating system environments can co-exist on the same physical computer in complete isolation from each other.

Each virtual machine runs on a hypervisor and typically needs the ability to communicate with other virtual machines and/or communicate over a network. A virtual switch is implemented in the hypervisor and provides the virtual machine with communication to a physical switch. However, virtual machines are created and destroyed more often than physical servers, and virtual machines may be moved from one hypervisor to another hypervisor to improve performance and resource utilization. Therefore, it is usually necessary to manually modify the network configuration when a virtual machine is created, destroyed, or moved/migrated. Specifically, providing network connectivity for a newly created or migrated virtual machine requires the hosting computer system or node to provide a network adapter that will provide the virtual machine with network access.

BRIEF SUMMARY

One embodiment of the present invention provides a computer-implemented method, comprising: running a multiprotocol I/O adapter using a first I/O protocol while a computer system including the multiprotocol I/O adapter is running; logically removing the multiprotocol I/O adapter from the system while the computer system continues running; causing the multiprotocol I/O adapter to switch to a second I/O protocol while the multiprotocol I/O adapter is logically removed and the computer system continues running; restarting the multiprotocol I/O adapter while the computer system continues running; and running the multiprotocol I/O adapter using the second I/O protocol while the computer system continues running.

Another embodiment of the present invention provides a computer program product including computer usable program code embodied on a computer usable storage medium. The computer program product comprises computer usable program code for initiating a hot-plug remove event to logically remove a multiprotocol I/O adapter from a computer system while the computer system continues running; computer usable program code for instructing the multiprotocol I/O adapter to switch from a first I/O protocol to a second I/O protocol while the multiprotocol I/O adapter is logically removed and the computer system continues running; and computer usable program code for initiating a hot-plug add event to restart the multiprotocol I/O adapter while the computer system continues running.

DETAILED DESCRIPTION

Figure 1:
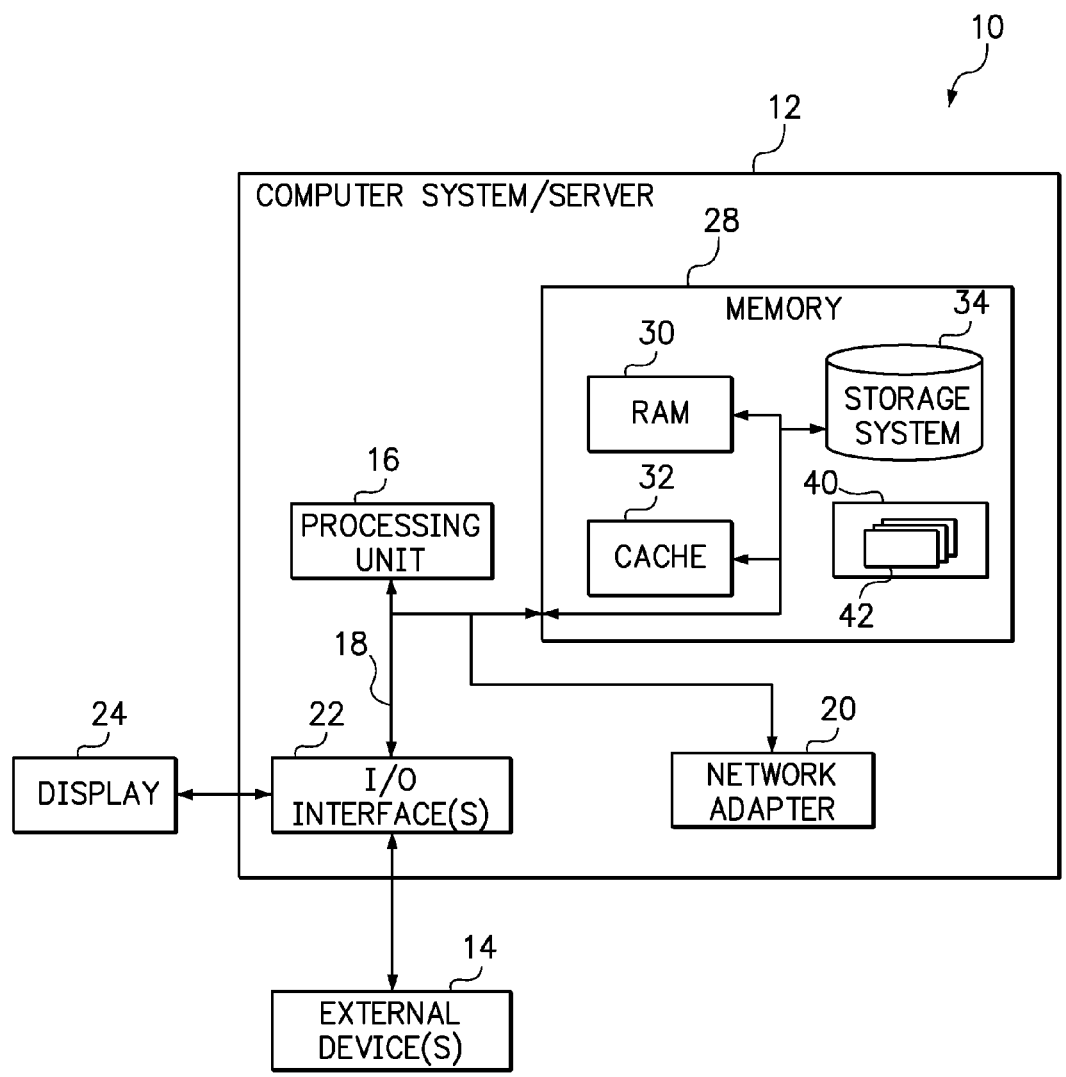
FIG. 1 is a diagram of a cloud computing node according to one or more embodiment of the present invention.

One embodiment of the present invention provides a computer-implemented method for switching the input/output (I/O) protocol of a multiprotocol I/O adapter while a computer system including the multiprotocol I/O adapter is running. Accordingly, embodiments of the present invention address the problem that the I/O protocol for existing multiprotocol I/O adapters may become fixed at the point of manufacture, or determined during boot up of the computer system.

The computer-implemented method comprises running a multiprotocol I/O adapter using a first I/O protocol while a computer system including the multiprotocol I/O adapter is running, and logically removing the multiprotocol I/O adapter from the system while the computer system continues running. The multiprotocol I/O adapter is then caused to switch to a second I/O protocol while the multiprotocol I/O adapter is logically removed and the computer system continues running. While the computer system still continues to run, the multiprotocol I/O adapter is restarted. After restarting, the multiprotocol I/O adapter runs using the second I/O protocol while the computer system continues running.

A primary advantage of the foregoing computer-implemented method is that it is not necessary to reboot the computer system in order to switch I/O protocols. In a virtualization environment that allows migration, the method allows a multiprotocol I/O adapter to meet the I/O requirements of one or more virtual machines. Since virtual machines are easily formed, eliminated or migrated between computer nodes or systems, the I/O requirements of a computer system in a virtualization environment are continually changing. Unless those virtual machines all have the same I/O requirements, the ability to host a virtual machine on a particular computer node, either through creation or migration, is limited by the I/O capabilities available on the computer node. The computer-implemented methods of the present invention allow a computer node to meet the I/O requirements that any virtual machine without populating the computer node with all types of I/O cards that might be needed and without continually physically swapping out the I/O cards within the computer node to meet the current needs. Therefore, the methods give workload managers and hypervisors greater freedom to determine the computer nodes on which the virtual machines should run.

The multiprotocol I/O adapter may be a standard PCI adapter card or an embedded PCI device. However, the multiprotocol I/O adapter has standby power following logical removal of the multiprotocol I/O adapter. Non-limiting examples of the I/O protocols that the multiprotocol I/O adapter might implement include Ethernet, Fibre Channel, and Infiniband.

In another embodiment of the invention, the method is performed in a hot-plug environment. For example, the multiprotocol I/O adapter may be logically removed from the system using a hot-plug remove event, preferably initiated by a service processor. The service processor may, without limitation, initiate the hot plug remove event by toggling the BUTTON# signal to a standard hot plug controller. Still further, the multiprotocol I/O adapter may be restarted using a hot-plug add event, which is also preferably initiated by the service processor. The service processor may, without limitation, initiate the hot-plug add event by toggling the BUTTON# signal or LATCHEN# signal to the standard hot plug controller. The service processor may be an out-of-band service processor or an in-band management agent.

The service processor may instruct the multiprotocol I/O adapter to switch its I/O protocol in various ways. A couple of these techniques include, for example, toggling a general purpose I/O (GPIO) pin on the multiprotocol I/O ASIC, or selecting one of many code loads via a multiplexor. Such a multiplexor would reside between the multiprotocol I/O ASIC and EEPROMs that contain the code loads that determine the personality of the multiprotocol I/O adapter. The code is supplied by the manufacturer of the multiprotocol I/O ASIC or adapter card and preprogrammed in the EEPROMs. When the adapter card powers on, the adapter card automatically loads the code from the EEPROM. The multiplexor would allow for the selection of multiple code loads from different EEPROMs, selecting an address range to load on an EEPROM installed on the multiprotocol I/O adapter, and writing a command to the multiprotocol adapter via an I2C interface.

In a further embodiment, the service processor may instruct the multiprotocol I/O adapter to switch to the second I/O protocol in response to the service processor detecting that the multiprotocol I/O adapter has been logically removed from the system. Optionally, the service processor may be notified that the multiprotocol I/O adapter has been logically removed from the system while the computer system is running. In another option, the service processor may detect that the multiprotocol I/O adapter has been logically removed from the system by monitoring the POWEREN# pin of a standard hot plug controller.

The foregoing methods may begin in response to the service processor receiving a message from a datacenter manager that instructs the computer system to cause the multiprotocol I/O adapter to switch from the first I/O protocol to the second I/O protocol. Still further, the datacenter manager may instruct the computer system to cause the multiprotocol I/O adapter to switch from the first I/O protocol to the second I/O protocol in response to migrating a virtual machine to the computer system, wherein the virtual machine requires the second I/O protocol. Alternatively, the switch to the second I/O protocol may be caused in response to a new virtual machine being provisioned to the computer system.

Another embodiment of the present invention provides a computer program product including computer usable program code embodied on a computer usable storage medium. The computer program product comprises computer usable program code for initiating a hot-plug remove event to logically remove a multiprotocol I/O adapter from a computer system while the computer system continues running; computer usable program code for instructing the multiprotocol I/O adapter to switch from a first I/O protocol to a second I/O protocol while the multiprotocol I/O adapter is logically removed and the computer system continues running; and computer usable program code for initiating a hot-plug add event to restart the multiprotocol I/O adapter while the computer system continues running. Other aspects of the foregoing methods may also be implemented in a computer program product, for example as computer usable program code for performing or initiating the performance of one or more of the method steps described herein.

It should be understood that although this disclosure is applicable to cloud computing, implementations of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/ server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/ server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
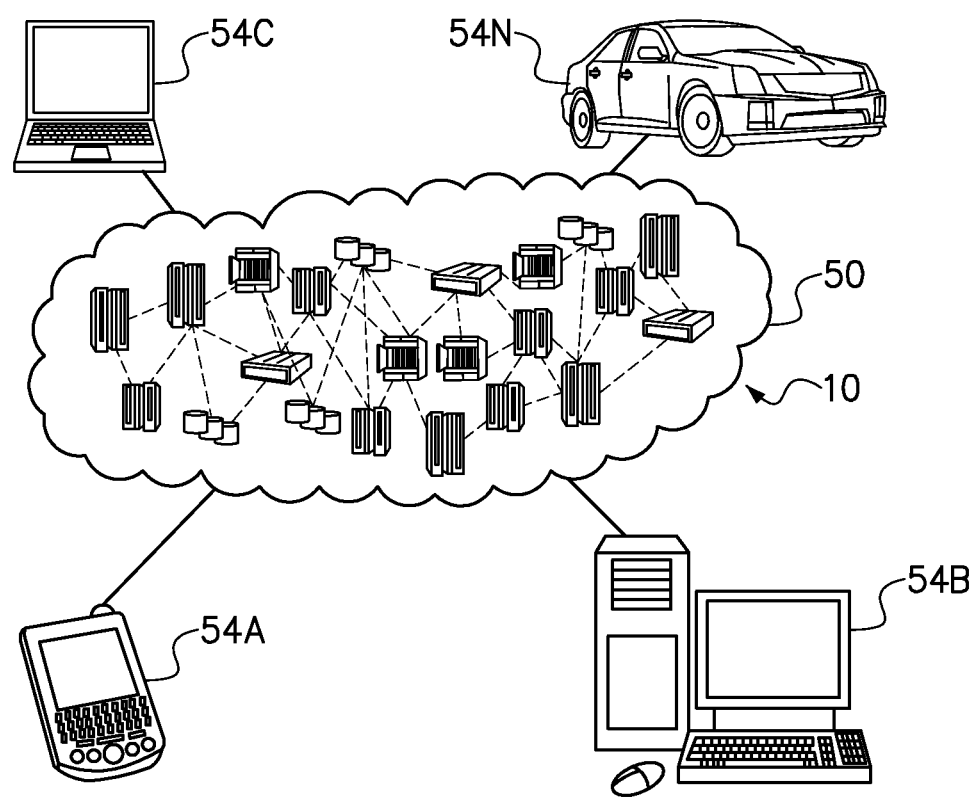
FIG. 2 is a diagram of a cloud computing environment according to one or more embodiment of the present invention.

Referring now to FIG. 2, an illustrative cloud computing environment 50 is depicted. As shown, the cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
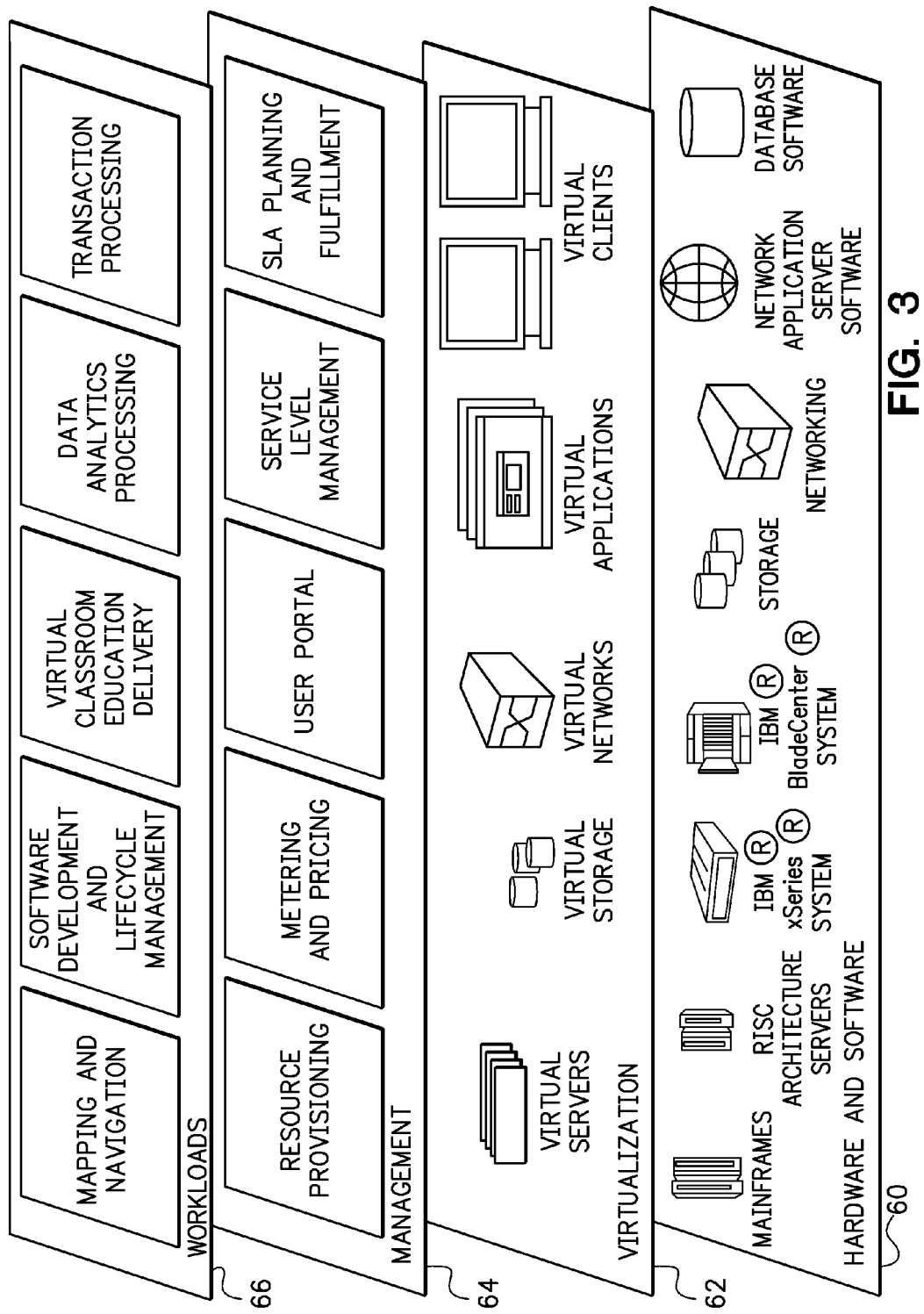
FIG. 3 is a diagram depicting abstraction model layers according to one or more embodiment of the present invention.

Referring now to FIG. 3, a set of functional abstraction layers provided by cloud computing environment 50 (Shown in FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

Figure 4:
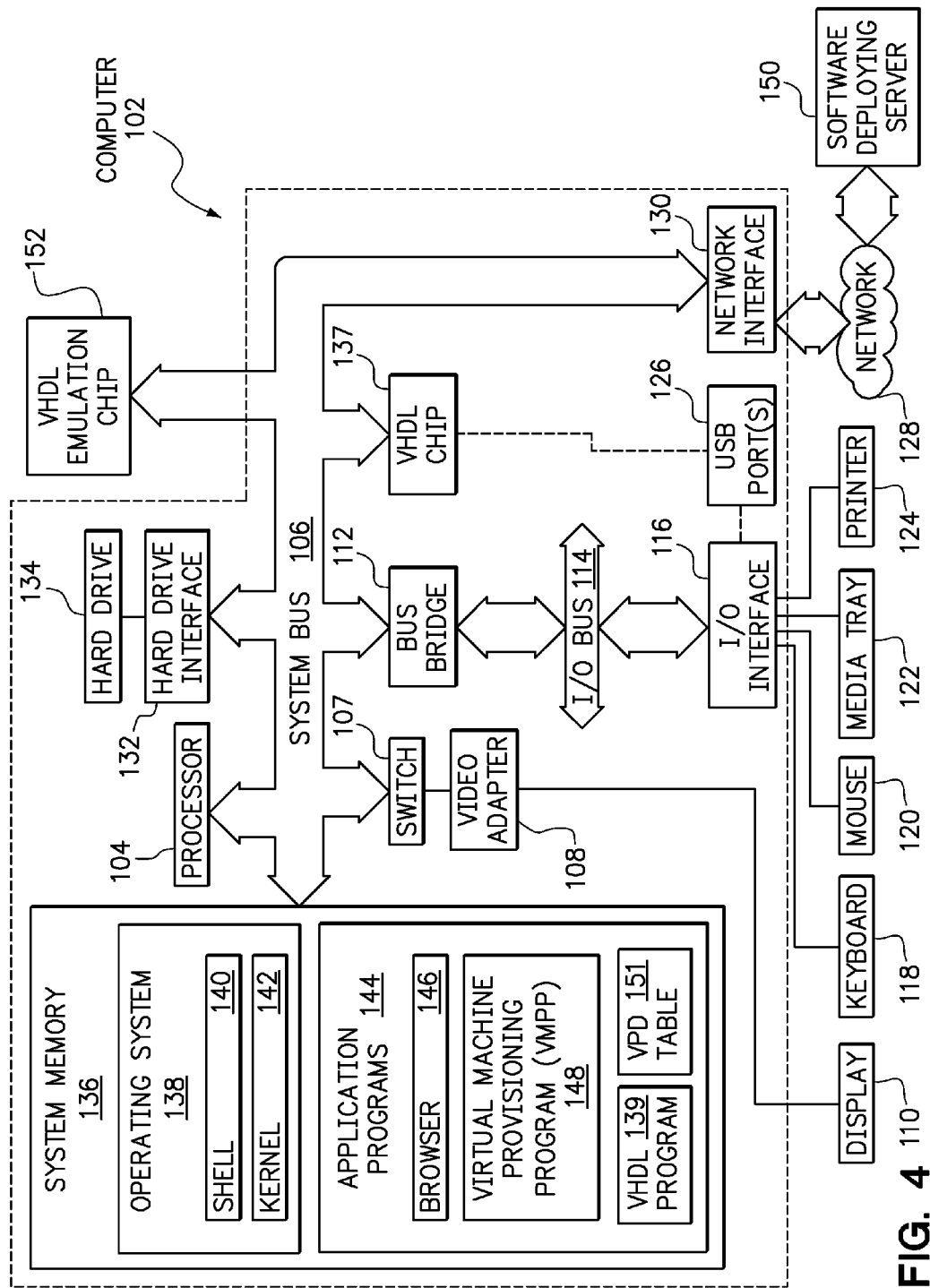
FIG. 4 is a diagram of an exemplary computing node that may be utilized according to one or more embodiments of the present invention.

FIG. 4 depicts an exemplary computing node (or simply "computer") 102 that may be utilized in accordance with one or more embodiments of the present invention. Note that some or all of the exemplary architecture, including both depicted hardware and software, shown for and within computer 102 may be utilized by the software deploying server 150, as well as the provisioning manager/management node 222 and the server blades 204a-n shown in FIG. 5. Note that while the server blades described in the present disclosure are described and depicted in exemplary manner as server blades in a blade chassis, some or all of the computers described herein may be stand-alone computers, servers, or other integrated or stand-alone computing devices. Thus, the terms "blade," "server blade," "computer," and "server" are used interchangeably in the present descriptions.

Computer 102 includes a processor unit 104 that is coupled to a system bus 106. Processor unit 104 may utilize one or more processors, each of which has one or more processor cores. A video adapter 108, which drives/supports a display 110, is also coupled to system bus 106. In one embodiment, a switch 107 couples the video adapter 108 to the system bus 106. Alternatively, the switch 107 may couple the video adapter 108 to the display 110. In either embodiment, the switch 107 is a switch, preferably mechanical, that allows the display 110 to be coupled to the system bus 106, and thus to be functional only upon execution of instructions (e.g., virtual machine provisioning program—VMPP 148 described below) that support the processes described herein.

System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and (if a VHDL chip 137 is not utilized in a manner described below), external USB port(s) 126. While the format of the ports connected to I/O interface 116 may be any known to those skilled in the art of computer architecture, in a preferred embodiment some or all of these ports are universal serial bus (USB) ports.

As depicted, computer 102 is able to communicate with a software deploying server 150 via network 128 using a network interface 130. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

The operating system 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other described computer systems.

Application programs 144 in the system memory of computer 102 (as well as the system memory of the software deploying server 150) also include a virtual machine provisioning program (VMPP) 148. VMPP 148 includes code for implementing the processes described below, including those described in FIGS. 2-8. VMPP 148 is able to communicate with a vital product data (VPD) table 151, which provides required VPD data described below. In one embodiment, the computer 102 is able to download VMPP 148 from software deploying server 150, including in an on-demand basis. Note further that, in one embodiment of the present invention, software deploying server 150 performs all of the functions associated with the present invention (including execution of VMPP 148), thus freeing computer 102 from having to use its own internal computing resources to execute VMPP 148.

Also stored in the system memory 136 is a VHDL (VHSIC hardware description language) program 139. VHDL is an exemplary design-entry language for field programmable gate arrays (FPGAs), application specific integrated circuits (ASICs), and other similar electronic devices. In one embodiment, execution of instructions from VMPP 148 causes the VHDL program 139 to configure the VHDL chip 137, which may be an FPGA, ASIC, or the like.

In another embodiment of the present invention, execution of instructions from VMPP 148 results in a utilization of VHDL program 139 to program a VHDL emulation chip 151. VHDL emulation chip 151 may incorporate a similar architecture as described above for VHDL chip 137. Once VMPP 148 and VHDL program 139 program VHDL emulation chip 151, VHDL emulation chip 151 performs, as hardware, some or all functions described by one or more executions of some or all of the instructions found in VMPP 148. That is, the VHDL emulation chip 151 is a hardware emulation of some or all of the software instructions found in VMPP 148. In one embodiment, VHDL emulation chip 151 is a programmable read only memory (PROM) that, once burned in accordance with instructions from VMPP 148 and VHDL program 139, is permanently transformed into a new circuitry that performs the functions needed to perform the processes of the present invention.

The hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

A cloud computing environment allows a user workload to be assigned to a virtual machine (VM) somewhere in the computing cloud. This virtual machine provides the software operating system and physical resources such as processing power and memory to support the user's application workload. The present disclosure describes methods for placing virtual machines among physical servers based on an image content classification or the amount of identical memory pages between two virtual machines.

Figure 5:
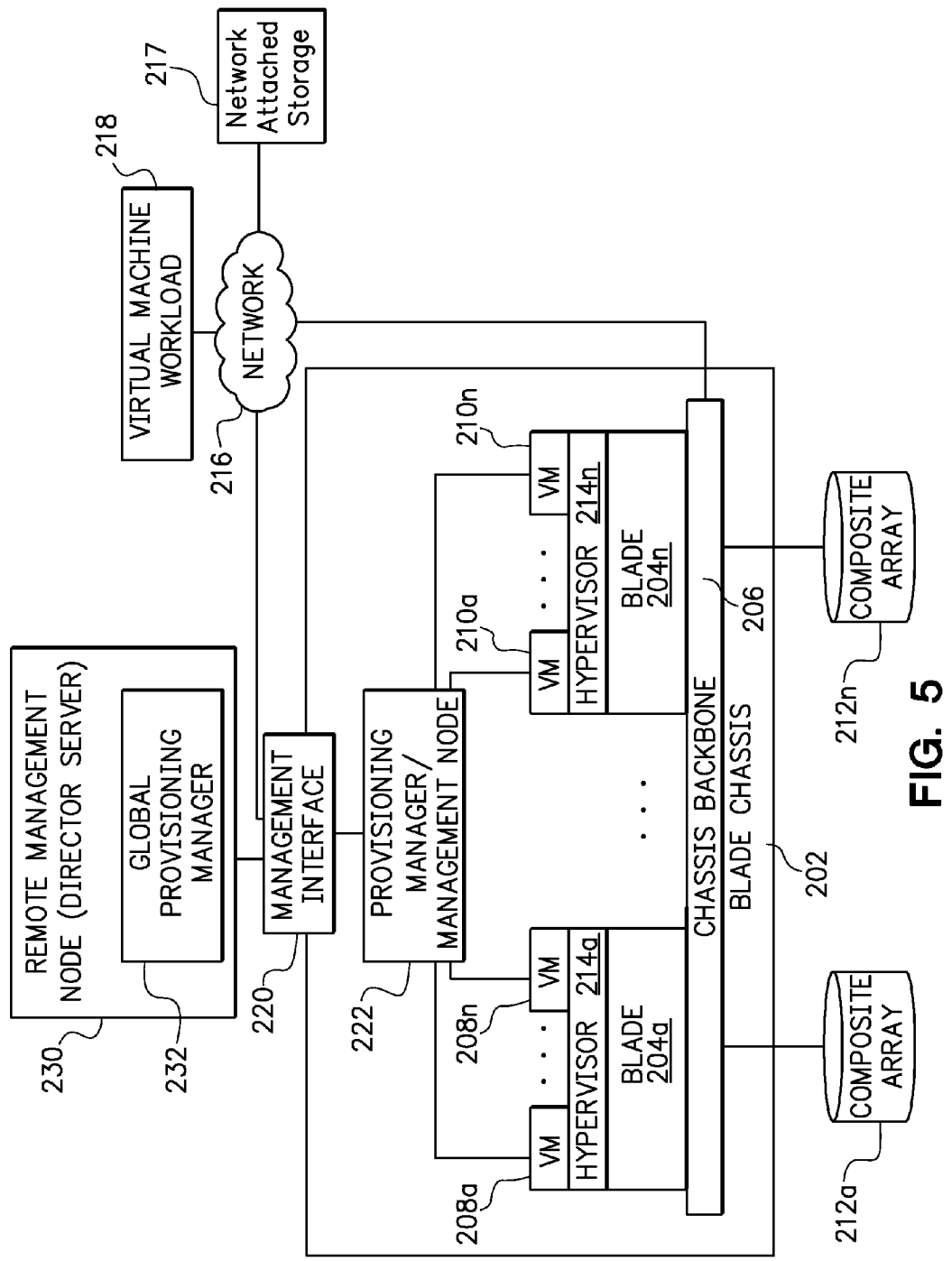
FIG. 5 is a diagram of an exemplary blade chassis that may be utilized according to one or more embodiments of the present invention.

FIG. 5 depicts an exemplary blade chassis that may be utilized in accordance with one or more embodiments of the present invention. The exemplary blade chassis 202 may operate in a "cloud" environment to provide a pool of resources. Blade chassis 202 comprises a plurality of blades 204a-n (where "a-n" indicates an integer number of blades) coupled to a chassis backbone 206. Each blade supports one or more virtual machines (VMs). As known to those skilled in the art of computers, a VM is a software implementation (emulation) of a physical computer. A single hardware computer (blade) can support multiple VMs, each running the same, different, or shared operating systems. In one embodiment, each VM can be specifically tailored and reserved for executing software tasks 1) of a particular type (e.g., database management, graphics, word processing etc.); 2) for a particular user, subscriber, client, group or other entity; 3) at a particular time of day or day of week (e.g., at a permitted time of day or schedule); etc.

As depicted in FIG. 5, blade 204a supports VMs 208a-n (where "a-n" indicates an integer number of VMs), and blade 204n supports VMs 210a-n (wherein "a-n" indicates an integer number of VMs). Blades 204a-n are coupled to a storage device 212 that provides a hypervisor 214, guest operating systems, and applications for users (not shown). Provisioning software from the storage device 212 allocates boot storage within the storage device 212 to contain the maximum number of guest operating systems, and associates applications based on the total amount of storage (such as that found within storage device 212) within the cloud. For example, support of one guest operating system and its associated applications may require 1 GByte of physical memory storage within storage device 212 to store the application, and another 1 GByte of memory space within storage device 212 to execute that application. If the total amount of memory storage within a physical server, such as boot storage device 212, is 64 GB, the provisioning software assumes that the physical server can support 32 virtual machines. This application can be located remotely in the network 216 and transmitted from the network attached storage 217 to the storage device 212 over the network. The global provisioning manager 232 running on the remote management node (Director Server) 230 performs this task. In this embodiment, the computer hardware characteristics are communicated from the VPD 151 to the VMPP 148 (See FIG. 4). The VMPP 148 communicates the computer physical characteristics to the blade chassis provisioning manager 222, to the management interface 220, and to the global provisioning manager 232 running on the remote management node (Director Server) 230.

Note that chassis backbone 206 is also coupled to a network 216, which may be a public network (e.g., the Internet), a private network (e.g., a virtual private network or an actual internal hardware network), etc. Network 216 permits a virtual machine workload 218 to be communicated to a management interface 220 of the blade chassis 202. This virtual machine workload 218 is a software task whose execution, on any of the VMs within the blade chassis 202, is to request and coordinate deployment of workload resources with the management interface 220. The management interface 220 then transmits this workload request to a provisioning manager/management node 222, which is hardware and/or software logic capable of configuring VMs within the blade chassis 202 to execute the requested software task. In essence the virtual machine workload 218 manages the overall provisioning of VMs by communicating with the blade chassis management interface 220 and provisioning management node 222. Then this request is further communicated to the VMPP 148 in the computer system. Note that the blade chassis 202 is an exemplary computer environment in which the presently disclosed methods can operate. The scope of the presently disclosed system should not be limited to a blade chassis, however. That is, the presently disclosed methods can also be used in any computer environment that utilizes some type of workload management or resource provisioning, as described herein. Thus, the terms "blade chassis," "computer chassis," and "computer environment" are used interchangeably to describe a computer system that manages multiple computers/blades/servers.

Figure 6:
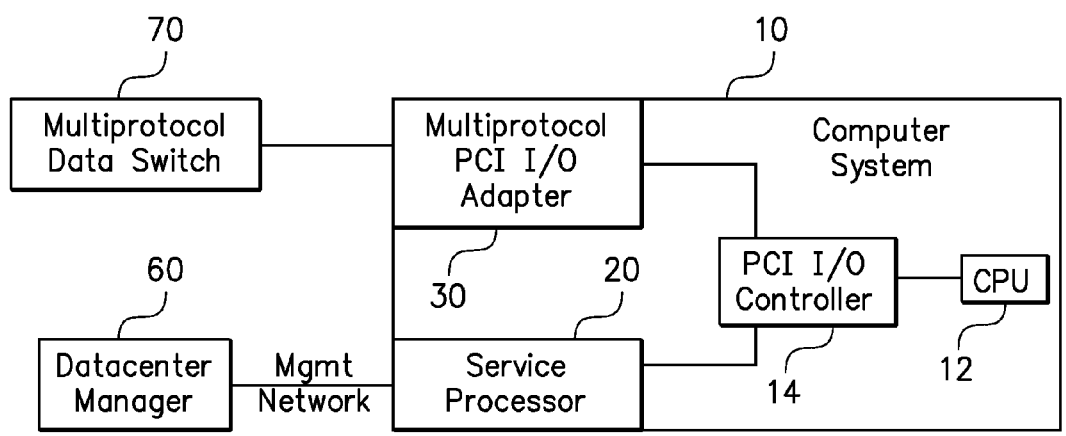
FIG. 6 is a diagram of a computer system in communication with a datacenter manager and a multiprotocol data switch.

FIG. 6 is a diagram of a computer system 10 in communication with a datacenter manager 60 and a multiprotocol data switch 70. The datacenter manager 60 may communication with the computer system 10 over a management network to monitor and control various aspects of the operation of the computer system 10. For example, the datacenter manager 60 and the computer system 10 may be part of a virtualization environment, wherein the datacenter manager 60 may include a local or global provisioning manager that guides the provisioning and migration of virtual machines among a plurality of computer systems 10 that run hypervisors.

The computer system 10 is not limited to a particular computer architecture, but includes a central processing unit (CPU) 12 and a PCI I/O controller 14. Optionally, the PCI I/O controller 14 may be an I/O controller portion of the computer system's core chipset. The computer system 10 further includes a service processor 20 and a multiprotocol PCI I/O adapter 30 that are in communication with the PCI I/O controller 14. Instructions from the datacenter manager 60 are received by the service processor 20. Input and output from the multiprotocol PCI I/O adapter 30 may be communicated with a multiprotocol data switch 70. The multiprotocol data switch 70 may then provide communication with one or more network (not shown).

Figure 7:
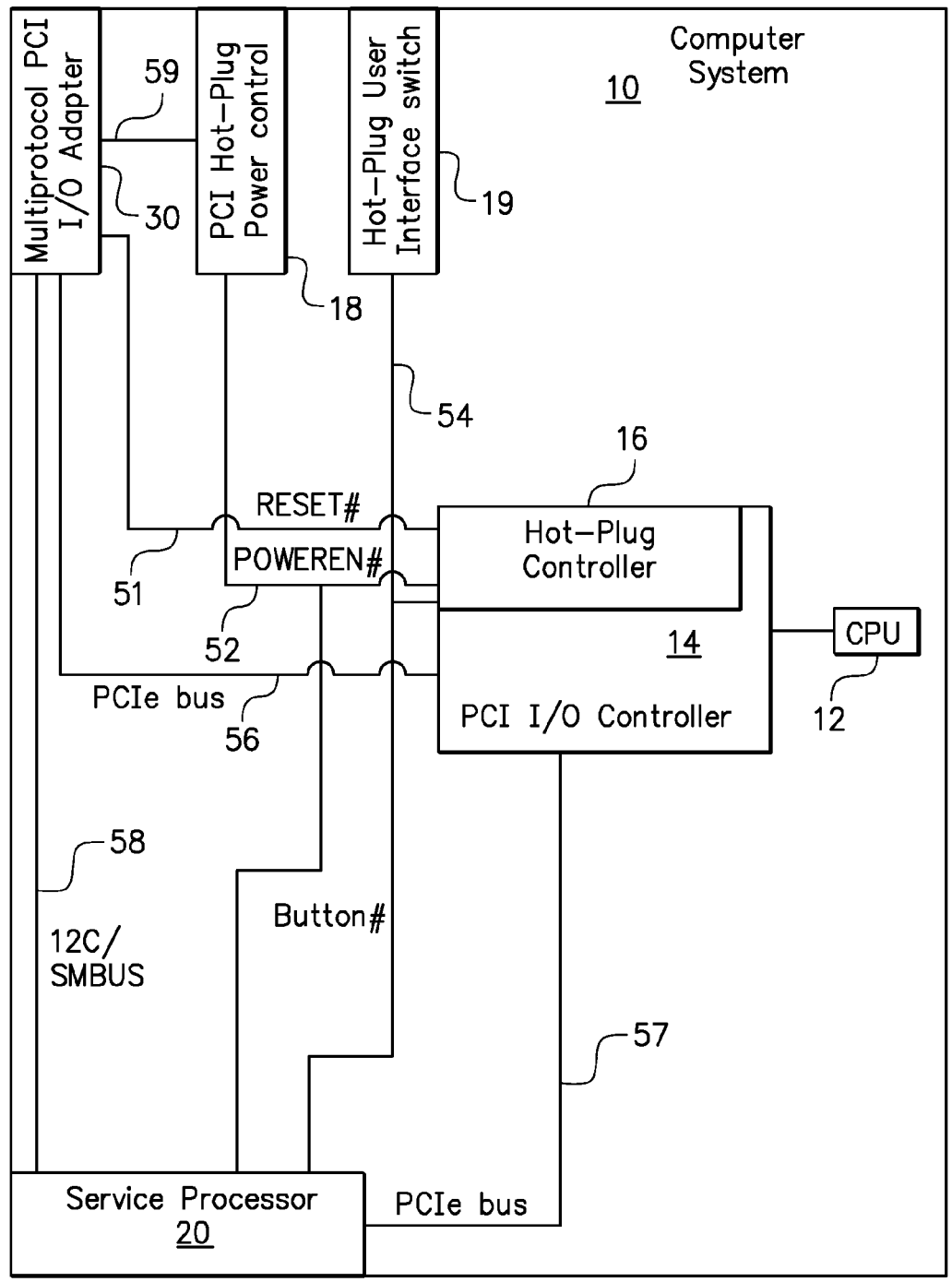
FIG. 7 is a diagram of the computer system of FIG. 1 showing the interconnection of the PCI I/O Controller, a multiprotocol PCI I/O adapter, and a service processor.

FIG. 7 is a diagram of the computer system 10 of FIG. 1 showing the interconnection of the PCI I/O controller 14, the multiprotocol PCI I/O adapter 30, and the service processor 20. As shown, the computer system 10 incorporates hot-plug technology. Specifically, computer system 10 includes a PCI hot-plug power controller 18, a hot-plug user interface switch 19, and a hot-plug controller 16 that is included with the PCI I/O controller 14. Accordingly, the computer system 10 is capable of "hot swapping" the multiprotocol PCI I/O adapter 30. The term "hot swapping" indicates the ability to remove and replace a component without requiring significant interruption or a shutdown of the computer system.

The standard hot-plug controller 16 has a RESET# line 51 to the multiprotocol PCI I/O adapter 30, a POWEREN# line 52 to the PCI hot-plug power controller 18, and a BUTTON# line 54 to the hot-plug user interface switch 19. The service processor 20 taps into the POWEREN# line 52 and the BUTTON# line 54, as will be discussed in greater detail below. A first PCIe bus 56 extends from the PCI I/O controller 14 to the multiprotocol PCI I/O adapter 30, and a second PCIe bus 57 extends from the PCI I/O controller 14 to the service processor 20. The service processor 20 and the multiprotocol PCI I/O adapter 30 may communicate over an inter-integrated circuit (I2C) or system management bus (SMBUS) line 58, though other manners of communication may be implemented. The PCI hot-plug power controller 18 is coupled to the multiprotocol PCI I/O adapter 30 via line 59.

Figure 8:
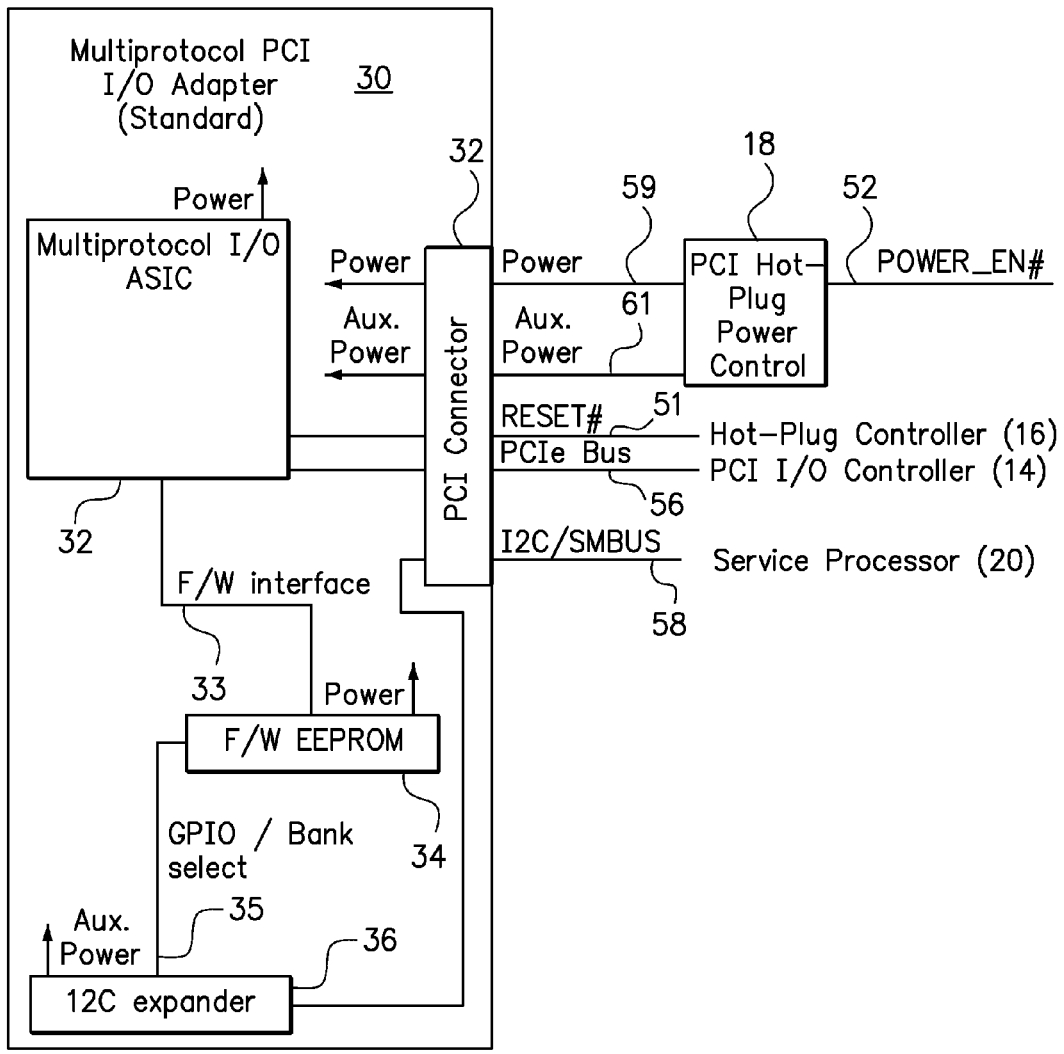
FIG. 8 is a diagram of a standard multiprotocol PCI I/O adapter.

FIG. 8 is a diagram of a first embodiment of the multiprotocol PCI I/O adapter 30. As shown, the multiprotocol PCI I/O adapter 30 is a standard PCI adapter having a PCI connector 32 that may be received into a similar PCI slot on a motherboard of the computer system. Accordingly, the PCI connector 32 enables communication to and from the PCI adapter 30.

In particular, the PCI connector 32 enables connection of power and auxillary power with the PCI hot-plug power controller 18 via line 59 and 61, respectively, communication with the hot-plug controller 16 via the RESET# line 51, communication with the PCI I/O controller 14 via the PCIe bus 56, and communication with the service processor 20 via the I2C or SMBUS line 58.

The multiprotocol PCI I/O adapter 30 includes a multiprotocol I/O application-specific integrated circuit (ASIC) 32 that performs the functions necessary for the adapter 30 to communicate with the data switch 70 in FIG. 6. The firmware electrically erasable programmable read-only memory (firmware EEPROM) 34 stores and, when instructed, is able to provide the code that determines the I/O protocol of the ASIC 32. The firmware EEPROM 34 provides the code over the firmware interface 33. The specific I/O protocol that is provided to the ASIC 32 is determined by the signal on the general purpose I/O (GPIO)/bank select line 35. However, the signal on the select line 35 is output from the I2C expander 36 in accordance with the instruction received over the I2C/SMBUS line 58 from the service processor 20.

In an alternative embodiment (not shown), the EEPROM may be included within the same hardware package as the ASIC 32, such that an external EEPROM 34 is not needed. Accordingly, the GPIO/Bank select line 35 would be coupled directly to the ASIC 32 from the I2C expander 36.

Figure 9:
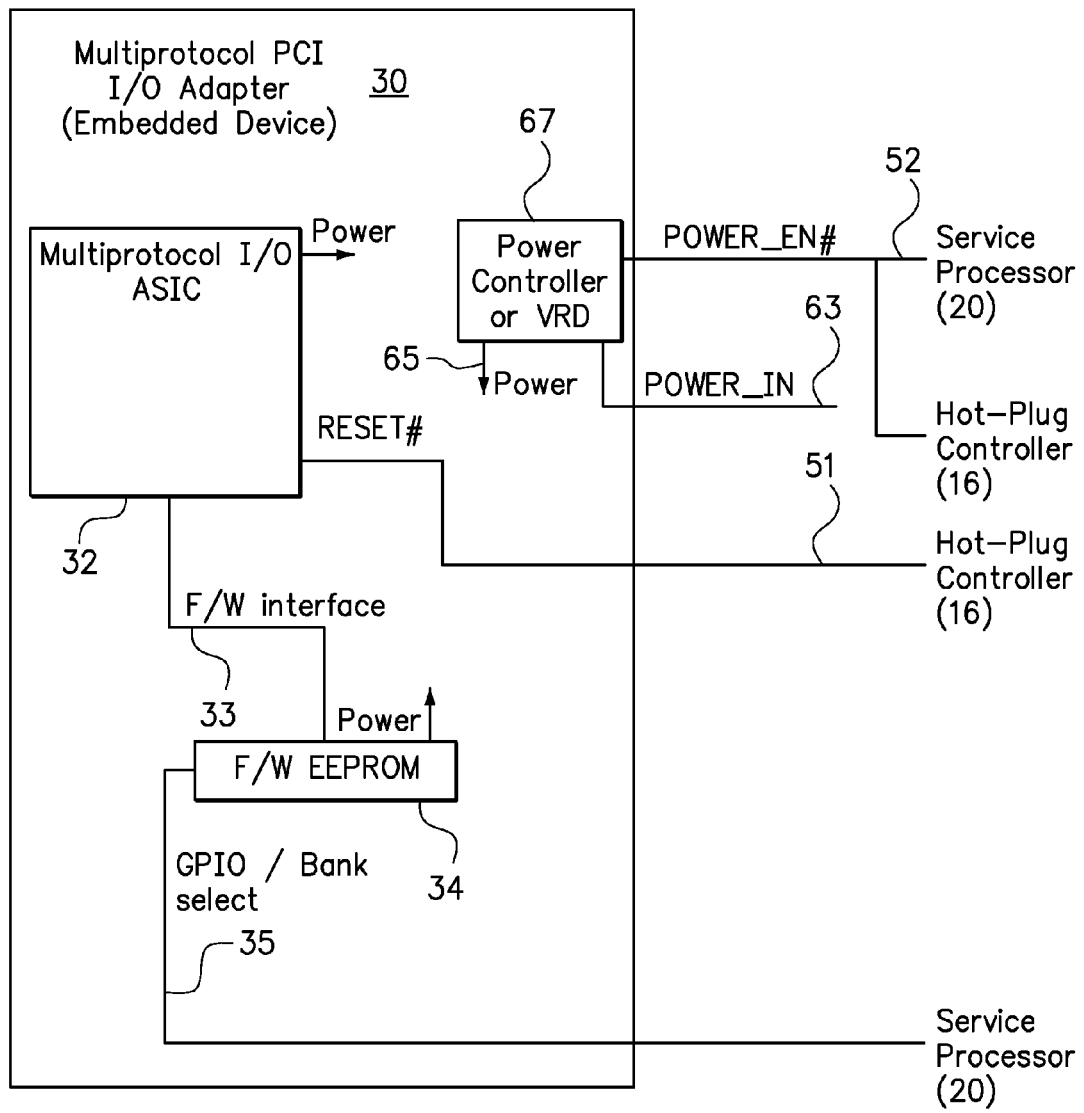
FIG. 9 is a diagram of a multiprotocol PCI I/O adapter in the form of an embedded device.

FIG. 9 is a diagram of a multiprotocol PCI I/O adapter 30 in the form of an embedded device, meaning that the device is built into the motherboard. With an embedded PCIe device, there is no requirement to provide a discrete I2C bus to handle communications from the service processor 20. Rather, the service processor 20 may directly communicate the GPIO/bank select signal 35 to the firmware EEPROM. In the previous embodiment of FIG. 8, the standard adapter is typically required to follow the PCI connector specification, such that the available I2C bus is a preferred communication channel for selecting the I/O protocol.

As with FIG. 8, there is the possibility of an alternative embodiment to FIG. 9 (not shown), where the EEPROM may be included within the same hardware package as the ASIC 32, such that an external EEPROM 34 is not needed and the GPIO/Bank select line 35 would be coupled directly to the ASIC 32 from the service processor 20.

The Power IN line 63 and the Power line 65 represent the flow of power into the multiprotocol I/O adapter card, power controllers, such as the power controller 67, and ASICs, such as the multiprotocol UI ASIC 32. As shown, the power controller 67 is physically integrated on the same printed circuit board as the digital electronics and may, therefore, be referred to as a Voltage Regulator Down (VRD).

Figure 10:
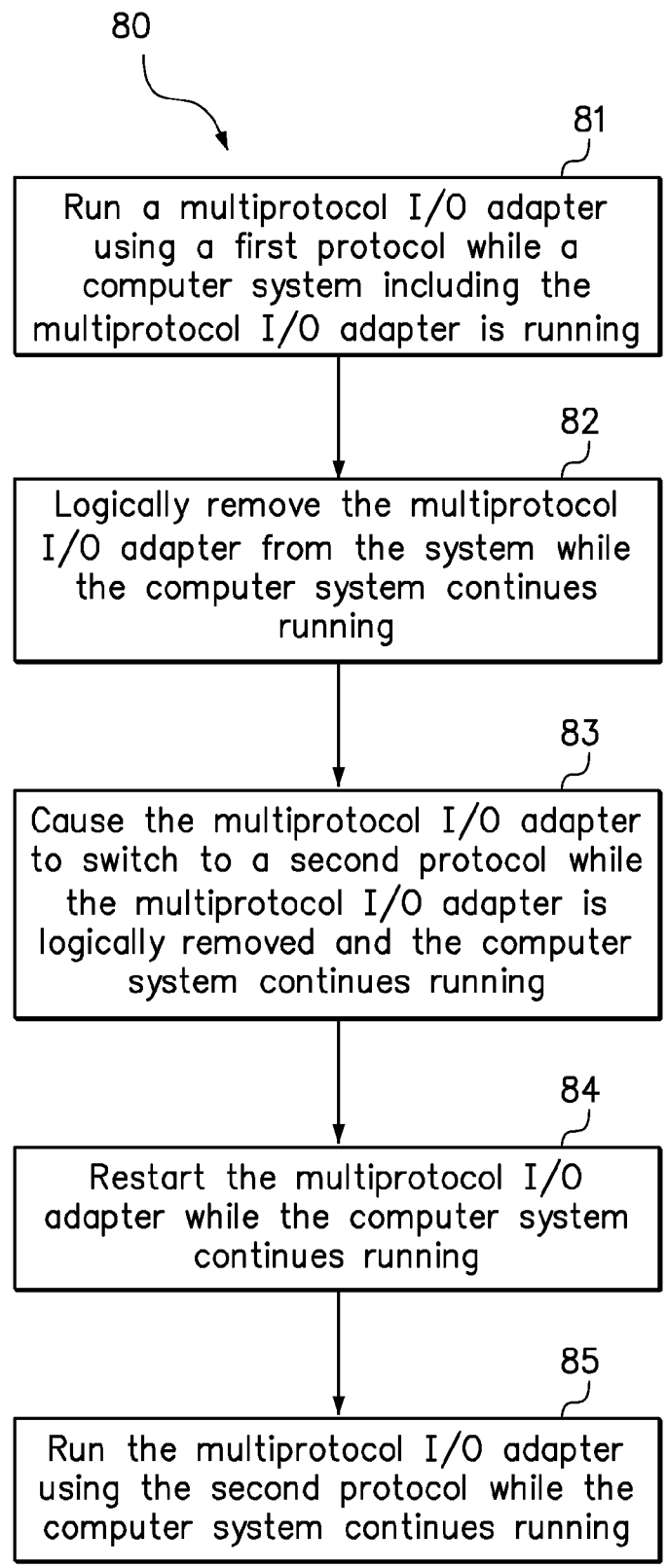
FIG. 10 is a flowchart of a first method of reconfiguring a multiprotocol PCI I/O adapter while the computer system is running.

FIG. 10 is a flowchart of a first method 80 of reconfiguring a multiprotocol PCI adapter while the computer system is running. In step 81, a multiprotocol I/O adapter is run using a first I/O protocol while a computer system including the multiprotocol I/O adapter is running. In step 82, the multiprotocol I/O adapter is logically removed from the system while the computer system continues running. Step 83 causes the multiprotocol I/O adapter to switch to a second I/O protocol while the multiprotocol I/O adapter is logically removed and the computer system continues running. The multiprotocol I/O adapter is restarted in step 84, while the computer system continues running. Then, in step 85, the multiprotocol I/O adapter is run using the second I/O protocol while the computer system continues running.

Figure 11:
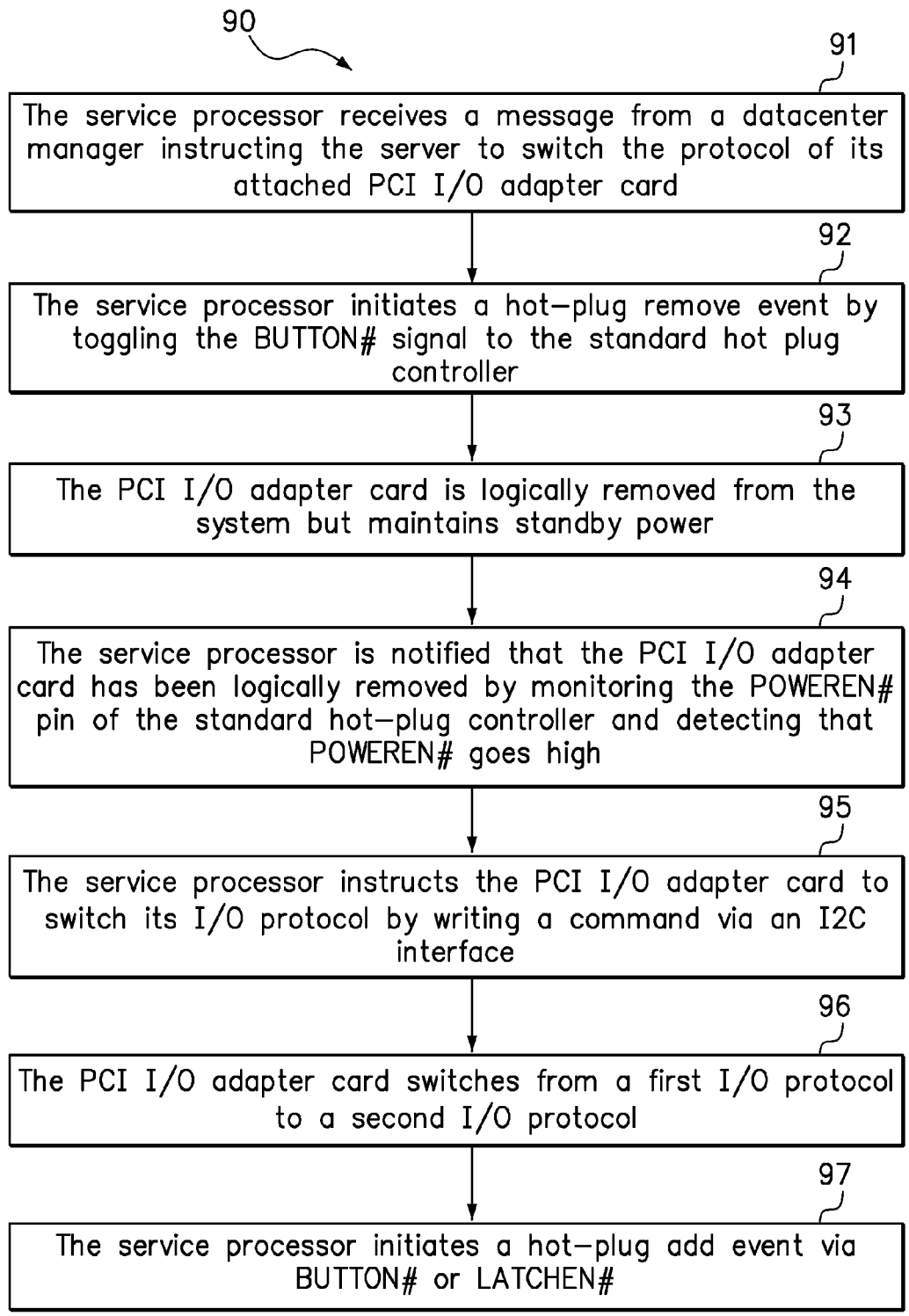
FIG. 11 is a flowchart of a second method of reconfiguring a multiprotocol PCI I/O adapter while the computer system is running.

FIG. 11 is a flowchart of a second method 90 of reconfiguring a multiprotocol PCI I/O adapter while the computer system is running. In step 91, the service processor receives a message from a datacenter manager instructing the server to switch the I/O protocol of its attached PCI I/O adapter card. In step 92, the service processor initiates a hot plug remove event by toggling the BUTTON# signal to the standard hot plug controller. The PCI I/O adapter card is logically removed from the system but maintains standby power in step 93. In step 94, the service processor is notified that the PCI I/O adapter card has been logically removed by monitoring the POWEREN# pin of the standard hot plug controller and detecting that POWEREN# goes high. The service processor instructs the PCI I/O adapter card to switch its I/O protocol, in step 95, by writing a command via an I2C interface. In step 96, the PCI I/O adapter card switches from a first I/O protocol to a second I/O protocol. Then, he service processor initiates a hot-plug add event via BUTTON# or LATCHEN# in step 97.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method, comprising:
    running a multiprotocol I/O adapter using a first I/O protocol while a computer system including the multiprotocol I/O adapter is running;
    logically removing the multiprotocol I/O adapter from the system while the computer system continues running;
    causing the multiprotocol I/O adapter to switch to a second I/O protocol while the multiprotocol I/O adapter is logically removed and the computer system continues running;
    restarting the multiprotocol I/O adapter while the computer system continues running; and
    running the multiprotocol I/O adapter using the second I/O protocol while the computer system continues running.

2. The method of claim 1, wherein the multiprotocol I/O adapter is logically removed from the system using a hot-plug remove event, and wherein the multiprotocol I/O adapter is restarted using a hot-plug add event.

3. The method of claim 1, wherein the multiprotocol I/O adapter is a standard PCI adapter card.

4. The method of claim 1, wherein the multiprotocol I/O adapter is an embedded PCI device.

5. The method of claim 1, wherein the multiprotocol I/O adapter has standby power following logical removal of the multiprotocol I/O adapter.

6. The method of claim 2, wherein a service processor initiates the hot-plug remove event and the hot-plug add event.

7. The method of claim 6, wherein the service processor initiates the hot plug remove event by toggling the BUTTON# signal to a standard hot plug controller, and wherein the service processor initiates a hot-plug add event by toggling the BUTTON# signal or LATCHEN# signal to the standard hot plug controller.

8. The method of claim 6, wherein the service processor is an out-of-band service processor.

9. The method of claim 6, wherein the service processor is an in-band management agent.

10. The method of claim 6, wherein the service processor instructing the multiprotocol I/O adapter to switch its I/O protocol, includes one or more steps selected from toggling a general purpose I/O (GPIO) pin on an ASIC included with the adapter, selecting one of many code loads via a multiplexor, selecting an address range to load on an EEPROM installed on the multiprotocol I/O adapter, and writing a command to the multiprotocol adapter via an I2C interface.

11. The method of claim 6, wherein the service processor instructs the multiprotocol I/O adapter to switch to the second I/O protocol in response to the service processor detecting that the multiprotocol I/O adapter has been logically removed from the system.

12. The method of claim 11, further comprising:
    notifying the service processor that the multiprotocol I/O adapter has been logically removed from the system while the computer system is running.

13. The method of claim 11, wherein the service processor detects that the multiprotocol I/O adapter has been logically removed from the system by monitoring the POWEREN# pin of a standard hot plug controller.

14. The method of claim 11, further comprising:
the service processor receiving a message from a datacenter manager that instructs the computer system to cause the multiprotocol I/O adapter to switch from the first I/O protocol to the second I/O protocol.

15. The method of claim 14, further comprising:
migrating a virtual machine to the computer system, wherein the virtual machine requires the second I/O protocol, wherein the datacenter manager instructs the computer system to cause the multiprotocol I/O adapter to switch from the first I/O protocol to the second I/O protocol in response to migrating the virtual machine to the computer system.

16. The method of claim 14, further comprising:
deploying a workload to the computer system, wherein the workload requires the second I/O protocol, wherein the datacenter manager instructs the computer system to cause the multiprotocol I/O adapter to switch from the first protocol to the second I/O protocol in response to deploying a workload to the computer system.

17. A computer program product including computer usable program code embodied on a computer usable storage medium, the computer program product comprising:
computer usable program code for initiating a hot-plug remove event to logically remove a multiprotocol I/O adapter from a computer system while the computer system continues running;
computer usable program code for instructing the multiprotocol I/O adapter to switch from a first I/O protocol to a second I/O protocol while the multiprotocol I/O adapter is logically removed and the computer system continues running; and
computer usable program code for initiating a hot-plug add event to restart the multiprotocol I/O adapter while the computer system continues running.

18. The computer program product of claim 17, wherein the hot plug remove event is initiated by toggling a BUTTON# signal to a standard hot plug controller, and wherein the hot-plug add event is initiated by toggling the BUTTON# signal or a LATCHEN# signal to the standard hot plug controller.

19. The computer program product of claim 17, further comprising:
computer usable program code for verifying that the multiprotocol I/O adapter has been logically removed from the system prior to instructing the multiprotocol I/O adapter to switch from a first I/O protocol to a second I/O protocol.

20. The computer program product of claim 17, further comprising:
computer usable program code for receiving a message from a datacenter manager that instructs the computer system to cause the multiprotocol I/O adapter to switch from the first I/O protocol to the second I/O protocol.

* * * * *